Figure 1:
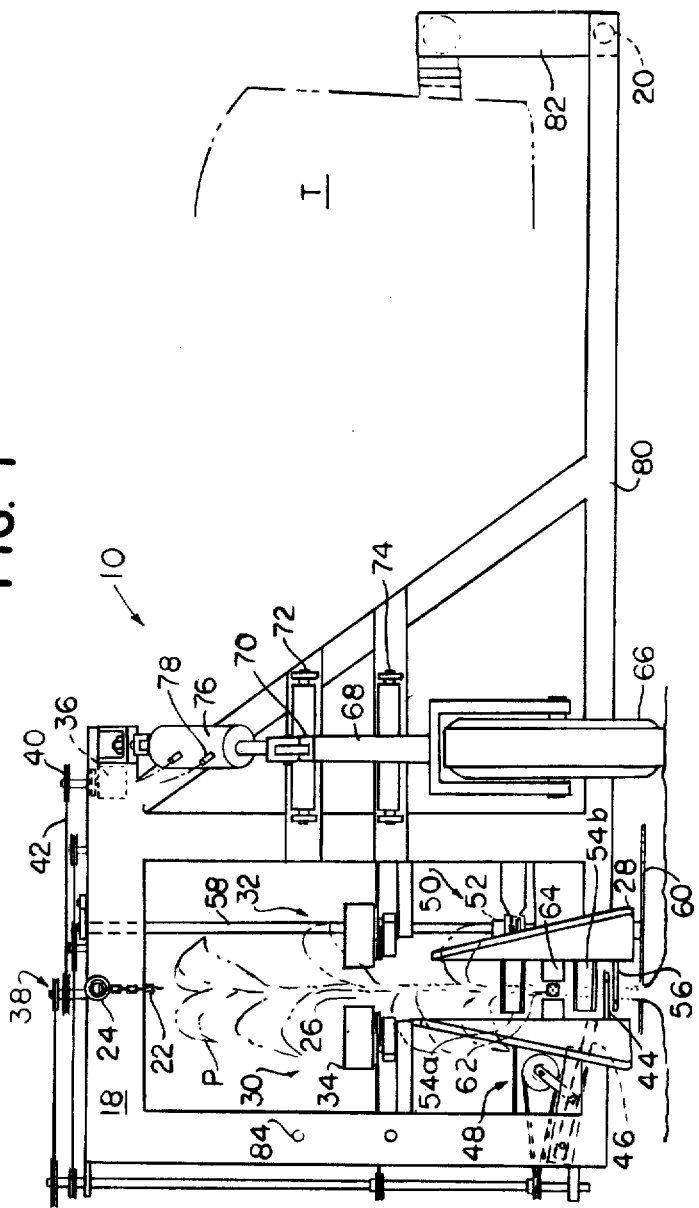

United States Patent [19]

Middleton

[11] 4,212,145
[45] Jul. 15, 1980

[54] TOBACCO HARVESTER WITH IN-LINE HARVESTING SYSTEM

[76] Inventor: Carlisle A. Middleton, 38 Dungarrie Rd., Baltimore, Md. 21228

[21] Appl. No.: 934,096

[22] Filed: Aug. 16, 1978

[51] Int. Cl.² .......................................... A01D 45/16
[52] U.S. Cl. .................................................. 56/27.5
[58] Field of Search ......................... 56/27.5; 214/5.5

[56] References Cited

U.S. PATENT DOCUMENTS

| | | | |
|---|---|---|---|
| 2,836,950 | 6/1958 | Anderson | 56/27.5 |
| 2,923,116 | 2/1960 | Brown | 56/27.5 |
| 3,059,401 | 10/1962 | Woods | 56/27.5 |
| 3,855,762 | 12/1974 | Middleton | 56/27.5 |

*Primary Examiner*—Jay N. Eskovitz
*Attorney, Agent, or Firm*—John F. McClellan, Sr.

[57] ABSTRACT

A tobacco protecting harvester of the floating spear type disturbs the plants a minimum amount but positively controls them at all times, while severing and loading them onto tobacco sticks in respective groups and offloading the loaded tobacco sticks. Passing down a row the advancing harvester (a) touches each successive plant at the base of the stalk with a first trigger causing a leaf lifter to raise the forward lower leaf out of the path of a rearward-urging stop-and-start conveyor, (b) touches the plant at the base of the stalk with a second trigger behind the first trigger causing the conveyor to urge the plant rearward onto a spear just as a saw severs the base, (c) urges the plant rearward along the spear and onto a tobacco stick and then (d) when the first-loaded plant strikes a third trigger indicating a full stick, offloads the tobacco stick with the plants still upright so that they fall as a group from stump-height gently to the ground and are tipped over on a side for later pickup; mechanisms guiding the plants include intake belts, vertical-axis rollers at the spear point and an endless belt on one side balancing the leaves; a novel floating support system holds the spear more stiffly by grasping the ends during spearing; a loaded stick ejector mechanism coacts with a hinged-sidewall socket at the spear butt and at the stick rear-support; positive valve control trigger-mechanisms and compact flotation and propulsion provisions are also disclosed.

25 Claims, 9 Drawing Figures

TOBACCO HARVESTER WITH IN-LINE HARVESTING SYSTEM

This invention relates generally to tobacco harvesting and particularly to an improved system for impaling whole tobacco plants in groups on sticks in preparation for curing.

The principal object of the invention is to provide an efficient system of the type described which harvests with a minimum of plant handling to minimize bruising, maintaining the plants harvested in growth attitude substantially, while harvested, and substantially level with growth height.

In the prior art numerous tobacco plant harvesting systems have been disclosed, including the differing-action spear gripping and handler-belt equipped mechanisms in my U.S. Pat. Nos. 3,798,884 issued Mar. 26, 1974 for TOBACCO HARVESTER; 3,855,762, issued Dec. 24, 1974, for TOBACCO HARVESER WITH IMPROVED SPEARING MEANS; and 3,902,607, issued Sept. 2, 1975 for TOBACCO HARVESTER PLANT HANDLING SYSTEM. Further patents known to show mechanisms of the type employed in air-cured tobacco plant handling include U.S. Pat. No. 3,921,824 issued to J. Larroche on 11-25-75, disclosing a tobacco plant severing and inverting system; and U.S. Pat. No. 3,997,066 issued to E. M. Thielen on 12-14-76, disclosing conveyor belt-handling and impaling spear apparatus for tobacco plants.

However, the present invention is believed to be an improvement over any prior system for the purpose, the inventor having himself designed, constructed and tested in actual tobacco harvesting service a number of full size harvesters prior to his construction and successful field testing of the present embodiment.

Further objects of the invention are to provide a system as described which is at the same time simpler, more reliable, more economical, more easily adjusted and operated, more easily manuevered and easier to construct than prior systems, which is safer and more compact than analogous prior harvesters, which is hard to damage and easy to repair in the field if damaged, and which provides relatively wide steering tolerances down the row.

Still further objects are to supply a basic harvester which is size adaptable to suit various characteristic types of tobacco grown in different areas of the world, without changing any but the simplest elements of the system, the frame and the length of some shafts, all being accomplishable by easy cutting and welding if desired.

In brief summary given for purposes of cursive description only and not as limitation the invention includes a harvesting system which passes the plants straight through, substantially unchanged in level and at growth orientation, and ejects them unbruised in successive stick-impaled batches.

Figure 2:
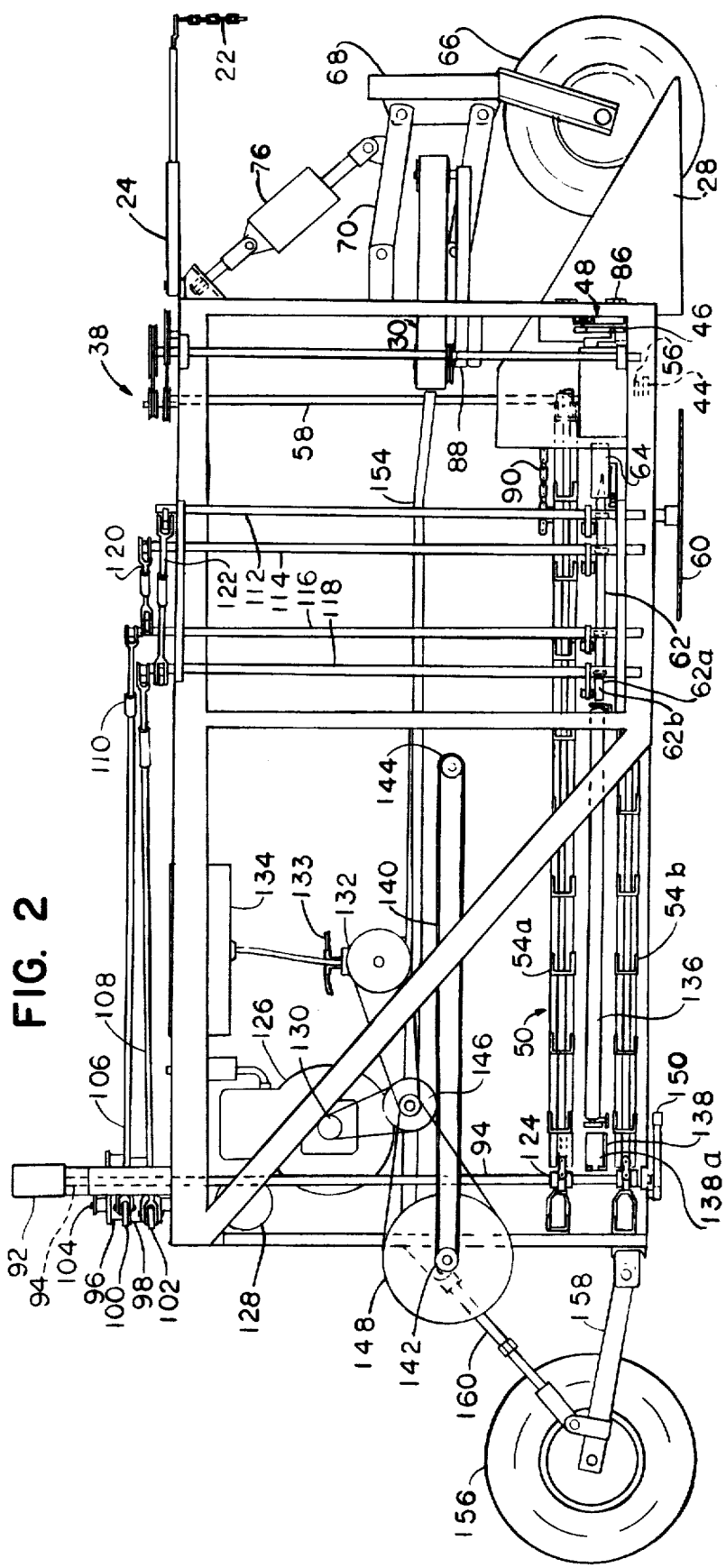
Figure 3:
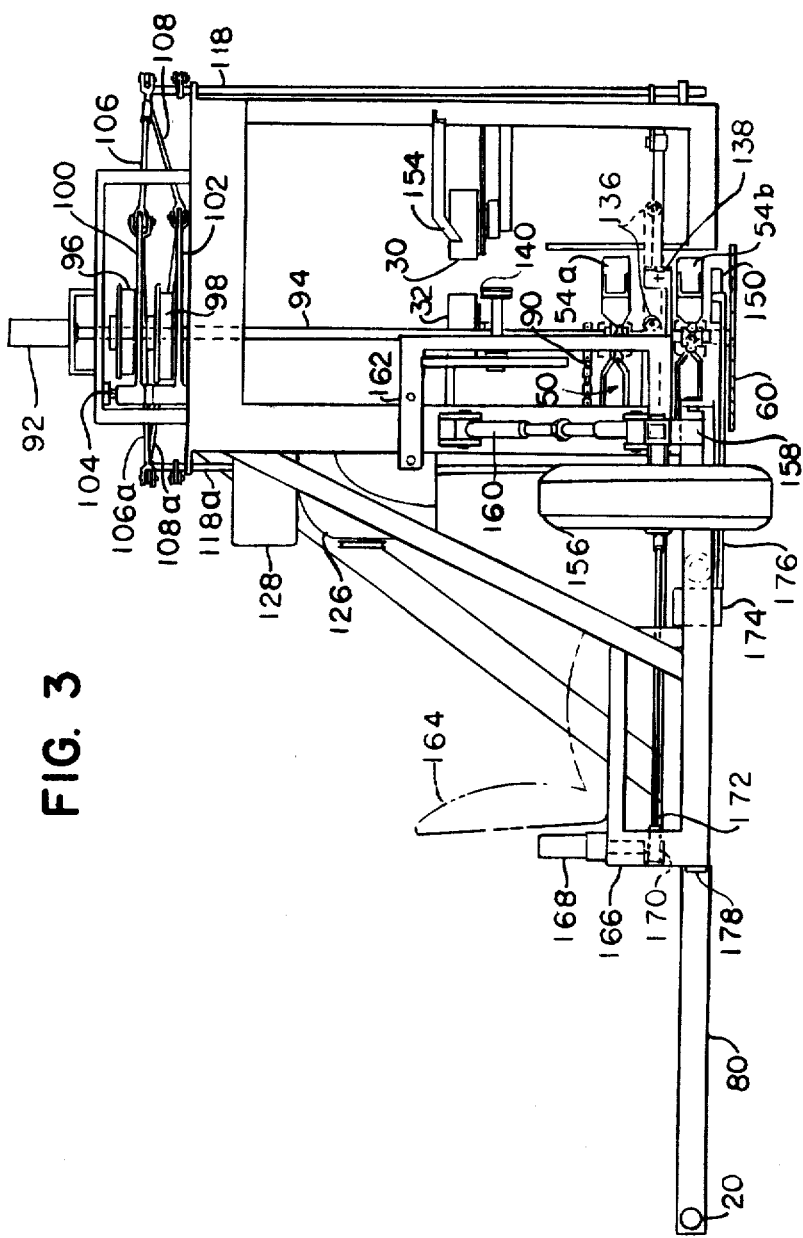
Figure 4:
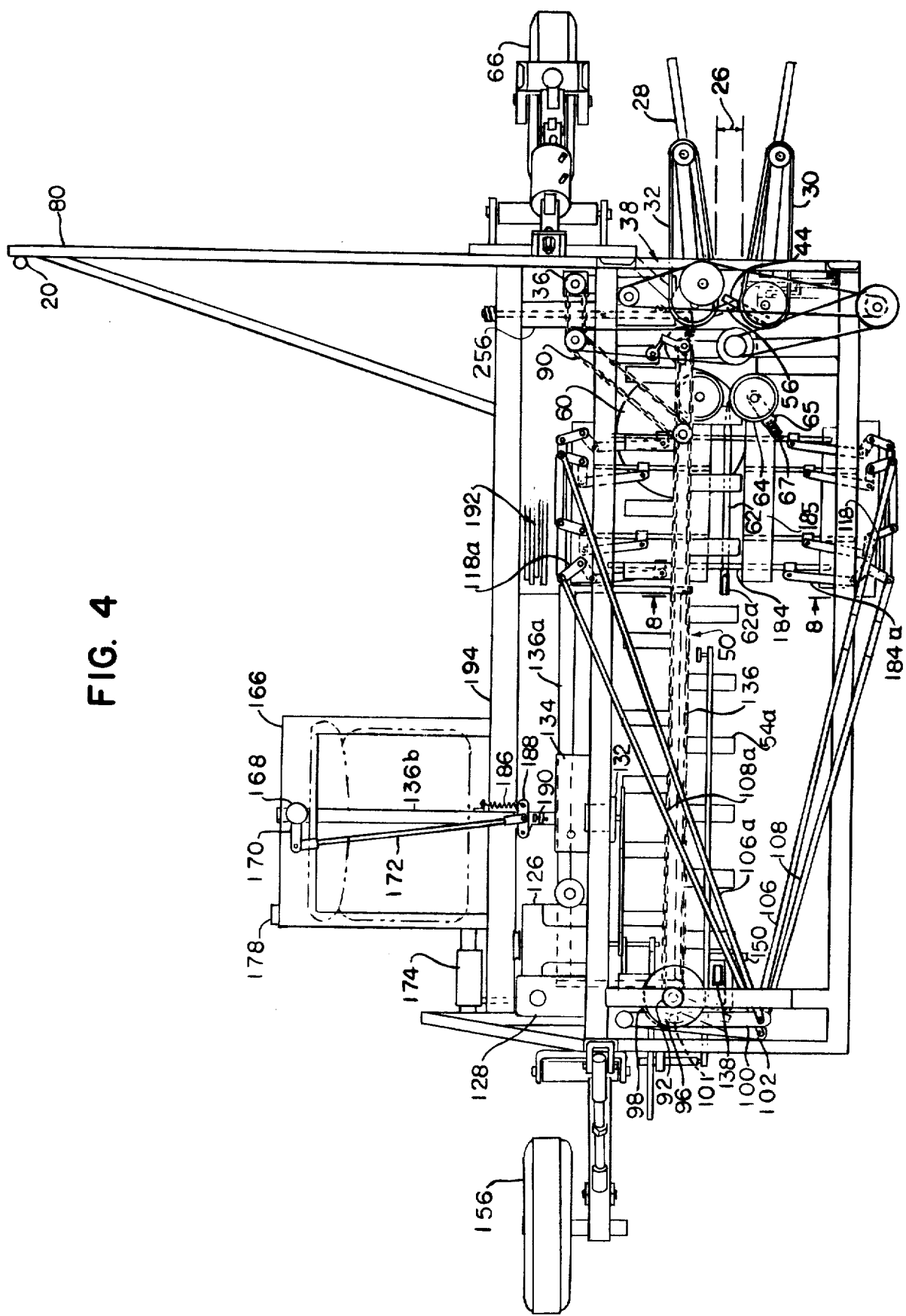
Figure 5:
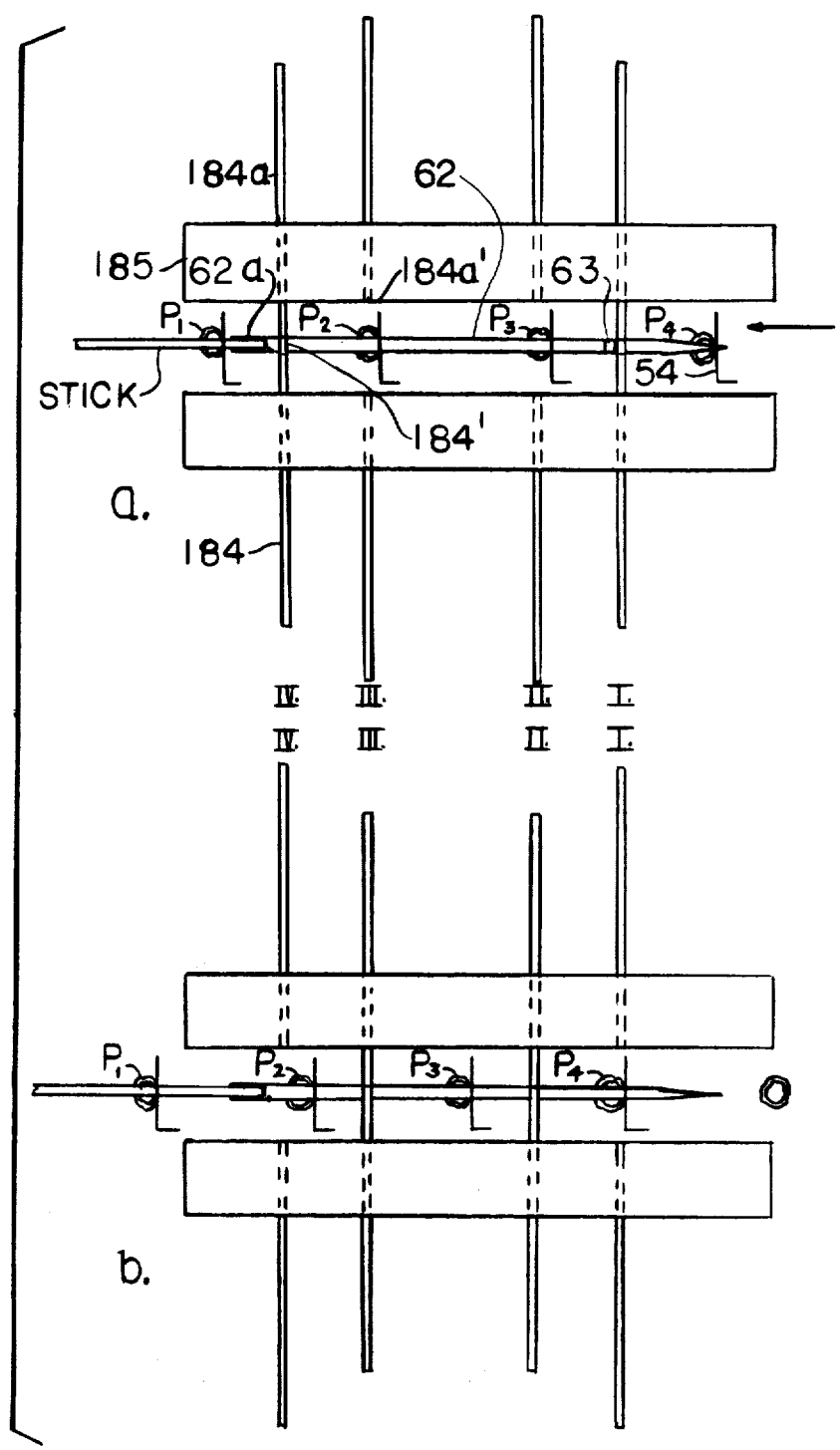
Figure 6:
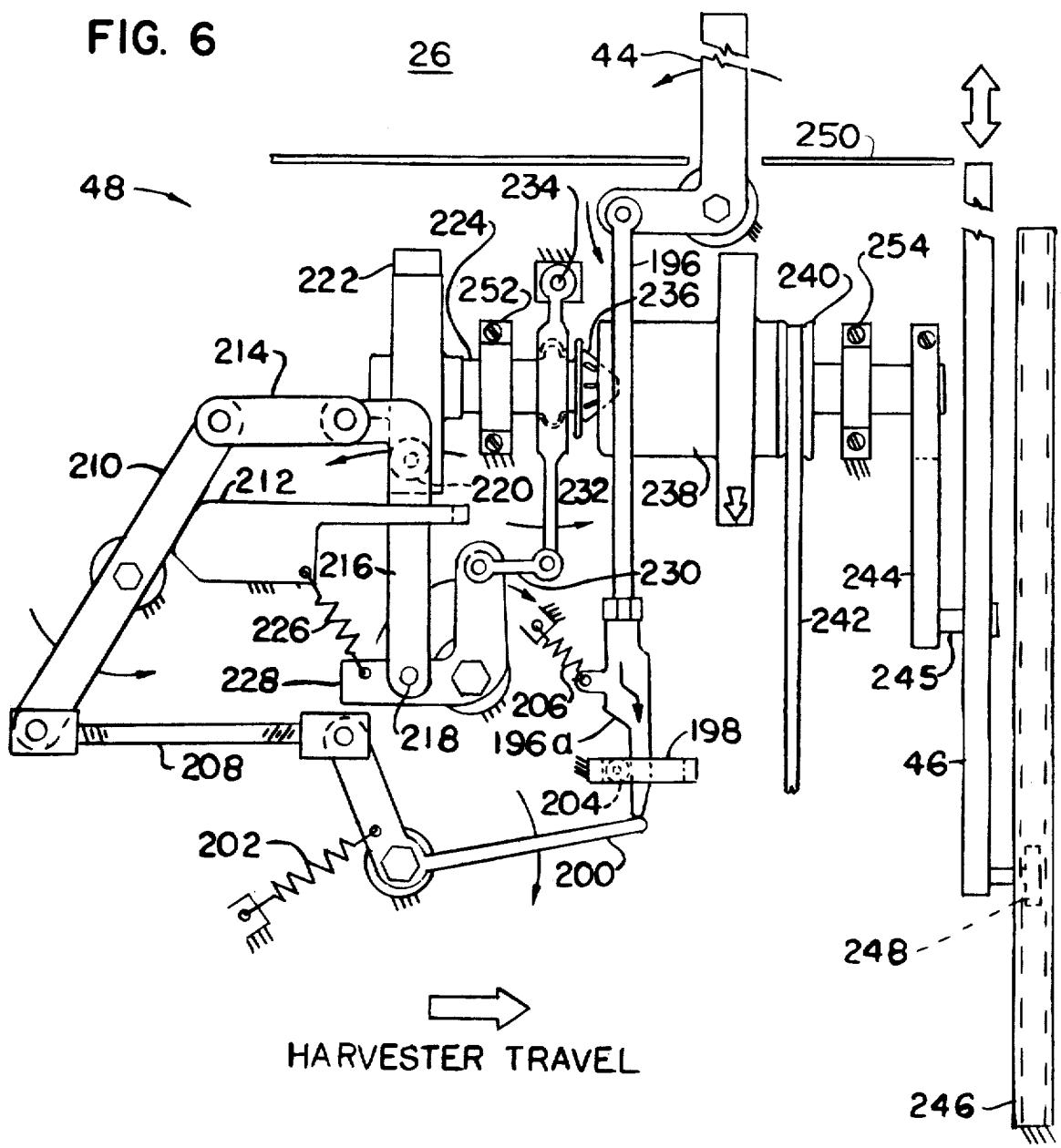
Figure 7:
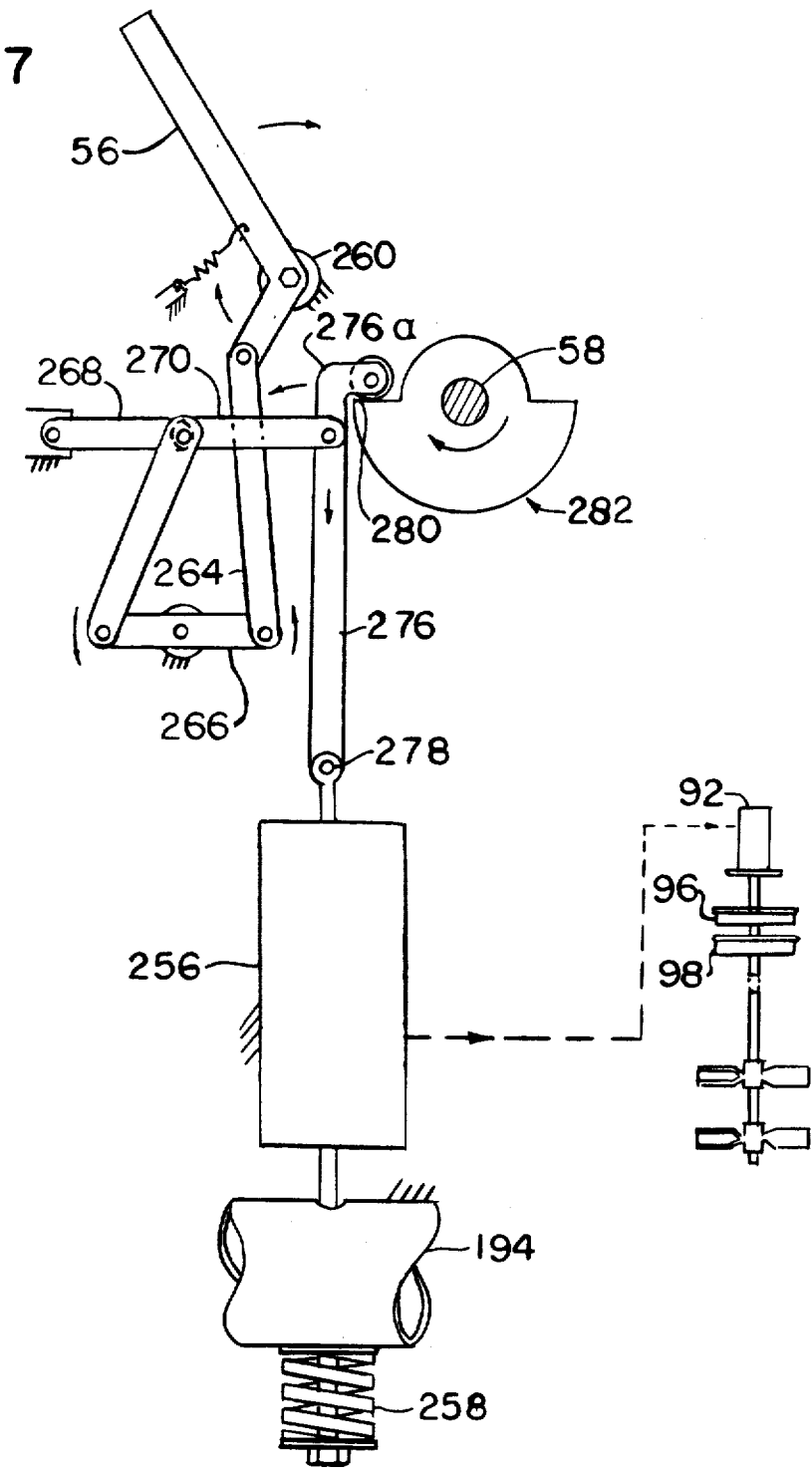
Figure 8:
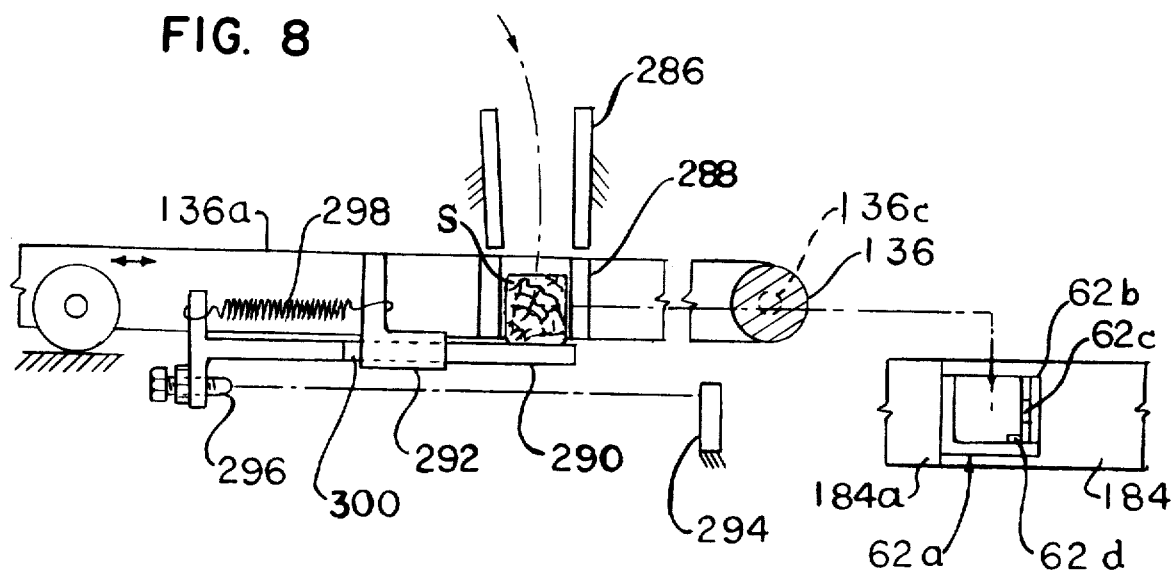
Figure 9:
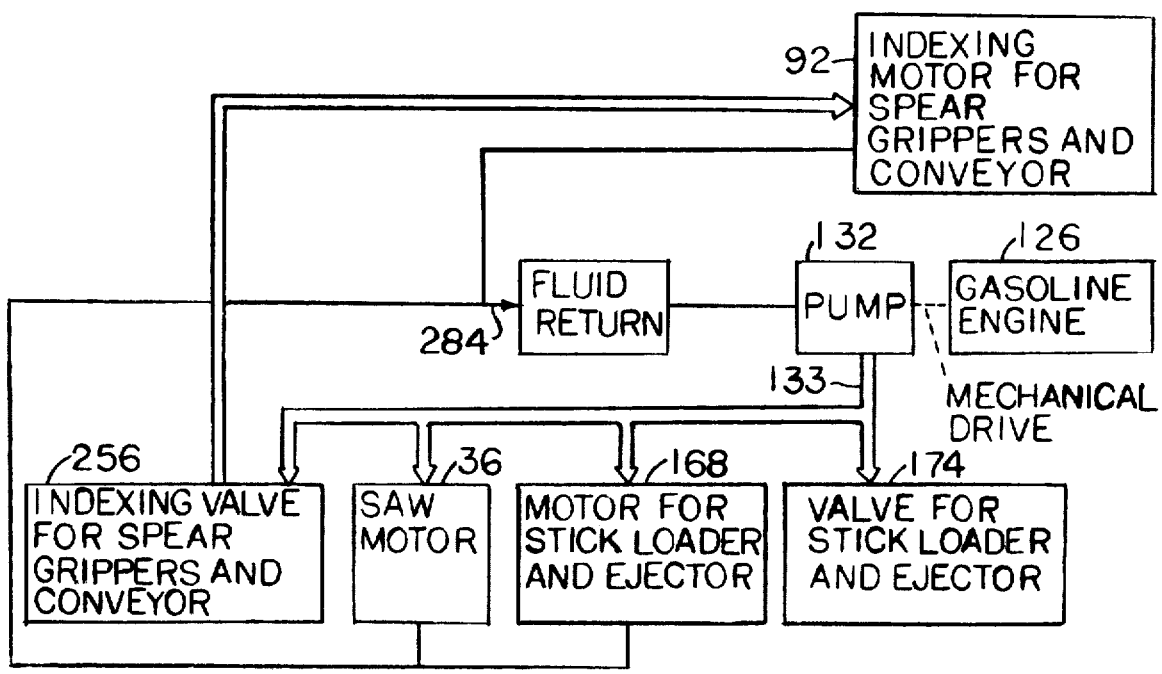

The above and other objects and advantages of the invention will become more readily understood on examination of the following description, including the drawings in which like reference numerals refer to like parts:

FIG. 1 is a front elevational partial view;
FIG. 2 is a right side elevational partial view;
FIG. 3 is a rear elevational partial view;
FIG. 4 is a plan partial view;
FIG. 5 diagrams spear support in plan view;
FIG. 6 diagrams a leaf lifter clutch linkage in plan view;
FIG. 7 diagrams synchronizing mechanism for spear-gripping/conveyor indexing operations, in plan view;
FIG. 8 diagrams stick feed in partially sectional elevational view adapted from 8—8, FIG. 4, and
FIG. 9 is a hydraulic system diagram.

A. STRUCTURAL RELATION AND OPERATION

FIGURE ONE

FIG. 1 shows the front aspect as a tractor T (phantom lines) urges the harvester 10 of this invention toward the reader along a row of standing tobacco plants P (phantom lines).

Two points of connection of the rectangular frame 18 with the tractor are employed, a forward ball joint 20 being indicated in this view. The driver steers in such manner as to keep centered on the tobacco plants the lower end of a chain 22 dangling from an angle-adjustable telescoping arm or boom 24 extensible several feet in front of the top of the harvester. Clearance of the central passage 26 in the frame may be just sufficient for the typical four-foot high Maryland grown plants.

A pair of triangular guides 28 extending forwardly from the frame to either side of each intaken plant P receives the lower leaves, and guides them upwardly.

Above these guides, a pair of vertical-axis endless-belt entry guides or moving guides 30, 32 with soft belts 34 of polyurethane foam receive in a throat formed between them the tender upper leaves of the plant P. The endless belts are powered from a motor 36 (dotted lines) at the left side of the frame (looking forward) by a conventional reduction system 38 including pulleys 40 and "V" belts 42, but at a speed made by the reduction system to be exactly equal to the forward speed of the harvester, so that no rubbing friction is produced between the rearward travelling inner run of the belts and the plants, the guides in effect being relatively stationary to the plants.

Three triggers control respective valves to actuate stages of plant handling, two at the front, and one at the rear and referred-to later.

As each standing plant is received in the front of the advancing harvester a first trigger or leaf-lifter trigger 44 touches the base of the stalk causing a lift arm 46 to extend under power of a clutch system 48 into the central frame passage below and ahead of the plant from the right side of the harvester, lifting the front lower leaves out of the way of the particular set of arms of the conveyor system 50 which will urge the plant stalk in increments of motion straight, upright, unrotated, and almost on a level, to the rear of the harvester. The conveyor system comprises upper and lower synchronous endless runs 52 bearing vertically spaced sets of horizontally spaced upper and lower arms 54a, 54b, the direction of run at the center being rearwardly, the return being idle and outboard.

One arm of each set is above spear level and the other below.

Immediately behind the first trigger lies a second trigger or indexing trigger 56 also at a position to contact the base of the stalk, and this contact causes a set of arms of the conveyor system to swing around the front axis 58 or shaft of the front sprocket of the conveyor endless run, engaging and steadying the stalk of the plant as it moves to the rear one spacing relative to the advancing harvester, during which a circular saw 60 severs the stalk at ground level and a floating spear 62 impales the stalk. The spear is mounted at substantially the height of the point on the growing plant which will be impaled by the spear, in this in-line harvesting system.

Relation of the conveyor and saw and spear are made such that the stalk is not urged by the conveyor until the instant of severance, at which time it urges the stalk onto the spear, aided in centering by a pair of rearwardly obliquely yielding spring-biased, soft rim vertical axis rollers 64 which form a throat just at the spear point.

Other details apparent in FIG. 1 include the front wheel 66 pivotal on a vertical castor shaft 68 itself supported by a parallelogramming frame 70 having horizontal-pivot connection 72, 74 to the frame left side, and to the castor structure. Remote height adjustment for the front end is provided for the tractor operator by a hydraulic piston 76 and lines 78 indicated in phantom but which run along the tractor hitch structure to a control valve on the tractor. The forward tractor-hitch ball joint is on the laterally extending forward frame 80 and connects with a downward arm 82 extending from the side of the tractor to the front. A rearward tractor-hitch is described later. Provision for easy roadway transport by towing includes pick-up holes 84 on the right-front upright of the simple inverted "U" frame and a castor similar to that just desribed but without height adjustment. This, together with the rear wheel suspension to be described later can provide a three point self-support for the harvester when moved between fields.

FIGURE TWO

REVIEW OF FIGURE ONE PROVISIONS, AND ADDITIONAL STRUCTURES INCLUDING TOBACCO PLANT POST-IMPALEMENT URGING ALONG SPEAR ONTO TOBACCO STICK, AND LOADED TOBACCO STICK EJECTION

FIG. 2, to review the FIG. 1 provisions, shows at the front or right hand end at the top of the frame the telescoping chain-support tubing 24 or boom, and guiding chain 22 dangling from it; the front wheel 66 and castor 68, pivotal suspension 70, remote height adjustment cylinder 76; the triangular plant guides 28 at the bottom, including horizontally-pivotal adjustments 86 to open and close the angle of the throat formed between them; above these the endless belt entry guides, 30 shown, likewise having pivotal support 88 (about the axis of the rear rollers) for varying the angle of the throat between them, the leaf lifter arm 46 and drive mechanism 48, the conveyor system 50 and arms 54a and 54b, the upper arms being above the level of the spear 62 and lower arms below the spear level; the front shaft 58 for the conveyor system, the vertical axis rollers 64 forming a throat at the spear point, the saw 60 which has a chain drive 90, the reduction system 38 and power system to be detailed, and the first and second triggers 44, 56.

Spear gripping of the floating spear will be described in more detail later, but is synchronized and indexed relative to incremental movement of the conveyor system and to incoming plants in response to the second trigger 56, and is powered by means of hydraulic motor 92 mounted on top of the frame at the rear. Power to the left and right sides to drive the opposed spear gripper portions is similar as will be seen. The motor has a downward output shaft 94 and fixed in series on this shaft are first and second internal cams 96, 98, with respective cam follower arms 100, 102, pivoted at 104 and connected by pushrods 106, 108 having length adjustments 110, which may be tubular turnbuckles, and extending forwardly to bellcranks 112, 114, 116, 118. The middle pair of bellcranks on each side interconnects with a short pushrod 120 and is driven together by one of the pushrods (106), similarly the outer pair of bellcranks on each side interconnects with a short pushrod 122 and is driven together. The bellcranks reach from top to bottom at the respective sides of the forward part of the frame; crank arms at top and bottom transmit the motion lateralliy to spear grippers at the bottom. The hydraulic motor 92 drives the conveyor system by means of the shaft 94 extending downward from it through the frame to form the rear pivot of the conveyor system at the conveyor drive sprockets 124, thus synchronizing conveyor and spear grippers.

On the far or left rear of the frame a gasoline engine 126 with fuel tank 128, and output pulley 130, drives hydraulic pump 132 to power the entire system through lines 133 (shown fragmentarily) as will be seen; 134 is the fluid system hydraulic reservoir.

As the plants move backward in increments of motion defined by the conveyor arm spacing they pass along the spear 62, which is 25 inches (62.5 cm) long and onto 52 inch long, 6-plant holding tobacco sticks (not shown here), in turn supplied by to-be-described apparatus associated with an ejector bar or pusher 136 from a position of loading by the sole operator (except for the tractor driver) who sits and loads sticks on the far or left side of the frame.

Each stick in turn falls into position for plant loading, held at the forward end in an upwardly open socket 62a in the butt end of the spear and at the rear end in a second upwardly open socket 138 adjacent the rear of the frame.

As the upright plants are moved backward they fill the respective sticks in turn, the upper portions of the plants laterally leaning against the rearward run of a small conveyor belt 140 mounted on first and second pulleys 142, 144 and driven through reduction system pulleys 146, 148, connected with the motor. When the initial plant on the stick reaches the rearmost position it strikes the third and final trigger or ejection trigger 150 which causes the stick pusher lying between the runs of the conveyor system and extending as the ejector bar 136 fore and aft almost from spear butt socket to rear socket, to push out lateraly against all the impaled plant stems on the stick simultaneously, ejecting the filled tobacco stick sideways. A spring hinged side 62b on the spear butt socket and a similar spring-hinged side 138a on the rear stick-holding socket permit the sideways ejection.

On ejection, the tobacco plants, having been carried from the time of cutting at a substantially level height at which the lower ends of the stalk nearly graze the ground, fall only an inch or so straight down on the ground, still upright. Then under easy urging of the ejector, they pivot as a group on the ground-supported severed lower end or butts of the stalks and recline slowly over onto the right side, free of the frame. The frame rear diagonal brace clears the right rear quarter of the frame at the position at which the plants fall over, as the harvester moves ahead and leaves them lying for pickup and further processing.

A fixed curving guide 154 may extend rearward from the endless belt entry guides 30, (32 not visible) on either or both sides, to insure smooth support for upper portions of the plants.

Rear flotation for the frame is provided by second pneumatic wheel 156 having a trailing link pivot structure 158 attaching it to the frame and above that a diagonal turn-buckle arm 160 for adjusting the angle of the trailing link to adjust rolling support height of the rear of the frame. Pitch angle adjustment for the frame is made such that the rear may be slightly higher to permit the severed ends of the tobacco plant stalks better to clear the stumps of previously severed plants, but in the harvesting the plants remain substantially in straight line and level, upright, undisturbed configuration.

FIGURE THREE

REVIEW OF FIGURE TWO PROVSIONS: AND ADDITIONALLY, STICK FEED AND EJECTOR ACTUATION AND REAR FRAME DETAILS

FIG. 3 shows the rear aspect of the invention, including the above described spear gripper and conveyor drive motor 92, with first and second internal cams 96, 98, driving pivoted arms 100, 102, pivoted at 104 in turn working pushrods 106, 108, (106a, 108a on left) in pairs connecting to left and right spear gripper actuating bellcrank rods, 118, 118a, visible; the endless belt intake guides 30, 32; saw drive-chain 90 and saw 60, conveyor system 50 with drive shaft 94, upper and lower conveyor arms, 54a and 54b, the stick feeder pusher and ejector bar 136 (extended position indicated in dashed lines) rear socket 138 for sticks (with spear axis indicated at cross) upper-plant small moving-belt guide 140, height-adjustable mount 162 for pulley system; curved guide 154 for upper part of plants; rear wheel 156 and suspension 158, 160, and engine 126 and tank 128.

In addition, this Figure shows left-side frame extension 80 with diagonal brace; operator seat 164 (phantom lines) on rear frame extension 166 and behind and beneath the operator seat the stick-feeder-and-ejector motor 168 and thrust arms and link actuator 170, 172 behind the seat. Valve 174 controls ejector motor 168 when actuated by third trigger 150 through connection 176. Pad 178 receives the rear connection for tractorl propulsion and ball joint 20, the front tractor-connection.

FIGURE FOUR

PLAN RELATIONS OF ABOVE-DESCRIBED PARTS: GUIDE ROLLER DETAILS, EJECTOR

FIG. 4 shows in plan view many of the structures described above and other elements, including the front and rear wheels 66, 156 and suspensions, the triangular intake guides 28 and endless belt intake guides 30, 32; first or leaf lifter trigger 44 and system, the second or indexing trigger 56; the drive motor and reduction system 38 for these and through chain drive 90 to saw 60 through the sprocket on the shaft located within the loop of the conveyor system 50; upper conveyor arms 54a, the paired rollers 64, which yield obliquely outwardly and rearwardly on conventional slides 65 opposed by adjustable compression springs 67 (any conventional mechanism will serve) and which form a throat at the point of the spear 62; spear grippers 184 having articulated-link connection 184a with the bellcrank drives typified by 118, 118a on the right and left, and driven through the pushrods 106, 108, 106a, 108a, in turn actuated by pivoted arms 100, 102 in response to internal cams 96, 98 through followers (101 shown) actuated by spear gripper and conveyor system motor 92; the spear butt socket 62a and rear socket 138 with respective hinged sides for stick ejection. Gripper guides into which the spear grippers retract, appear at 185, these are spaced parallel to and on either side of the spear.

Also shown are the stick ejector bar 136 which is mounted across the ends of a squared "Y" frame 136a supported conventionally at each end by a roller and track. In operation, as noted, the third trigger 150 actuates valve 174 to turn motor 168 which through arm 170 and adjustable-length link 172 moves the leg 136b of the "Y" frame along through a spring 186, guided by pivotal link 188 on the leg. This cushions the operation and loosens tolerances. Adjustable screw stop 190 on 136b limits the pivotal motion of the link.

Sticks are loaded by the operator from a stick supply 192, forward on the left side, one by one into a stick conveyor fixed on each side of the squared "Y" structure short of the stick ejector bar. This will be described in detail later, as will be a trip which strikes a stop and slides open the bottom of the stick conveyor structure at the limit of travel, dropping the stick into place with the forward end in the spear-butt socket and the rearward end in the rear socket, ready to receive the next load of impaled plants from the spear.

Also shown are the engine and tank 126, 128 and hydraulic pump and tank 132, 134; the operator seat (phantom lines); the tractor pick-up points 20, 178, and a fore-and-aft massive tubular frame member 194 clearly visible here for the first time, which carries propulsion loads and the left side extensions 80, 166 of the frame. 256 refers to an indexing valve explained in reference to later Figures.

The boom 24 shown in the first two Figures is omitted from FIG. 4 for clarity. 26 denotes the central passage.

FIGURE FIVE

FLOATING SPEAR GRIPPER MECHANISM

FIG. 5 at "a" and "b" diagrams successive positions of the conveyor-synchronized floating spear mechanism comprising spear 62 and four pairs of end-opposed spear grippers, 184a far side, 184 near side of each. The spear and the gripper mechanism are short-coupled, hold rigidly and in non-fouling manner. Support is provided at both ends of the spear at the instant of stalk-spearing and spear unloading at the rear socket, the gripper adjacent the point and the gripper at the extreme rear being advantageously closed at this time of heaviest loading. The near or right-side grippers 184 have ends notched as at 184' to receive three sides of the rectangular-section spear. The far side spear grippers have flat ends 184a'. 63 is a non-slip lug on top of the spear; there is one of these behind each spear gripper station.

Geometry of the coacting parts is important. The grippers are of flat strip, on edge, for compactness along the spear. The conveyor arms 54 are on 9 inch (22.8 cm) spacings, the distance between conveyor movement stations, in the present embodiment. The forward set of spear grippers (I) is preferably parallel-spaced from the second set of spear grippers (II) a distance equal to one-half the conveyor arm spacing or 4½ inches (11.4 cm), and from the third set of spear grippers (III) a distance equal to 1½ times the conveyor arm spacing or 13 ½ inches (34.2 cm) and from the fourth or rearmost set of spear grippers (IV) a distance equal to two conveyor arm spacings, 18 inches (45.6 cm).

Rigidity of the holding by the short-coupled, longitudinal grippers permits the spear to reach the center between the effectively large-diameter (6 inch or 15 cm) guide rollers (previous Figure at 64), protruding about four to five inches (10 to 12.5 cm) ahead of the front gripper. The spear extends only sufficiently behind the rearmost spear gripper to provide room at the butt for the spear stick holding socket 62a, that is, about three inches (7.5 cm).

In operation, as shown at position "a", a stalk P4 is being forced along the point of spear 62 by a conveyor arm 54 moved by a pivotal link (in response to rotation of a bellcrank) in the direction of the arrow, following previously impaled stalks P3, P2, P1. The center two stalks are respectively passing the center pairs of grippers II, III which have translated longitudinally into open position completely retracted into the straight side-guides 185. The grippers cam-open and shut rapidly at the start of each relatively slow conveyor movement. Next, as shown at "b", the center two grippers close and the end grippers completely retract, permitting passage of stalk P2 onto the tobacco stick while stalk P3 advances the 9 inch distance between the center two grippers, stalk P4 passes the front gripper, and a new stalk approaches the spear system. Plant spacing in the field differs from State to State but in this combination, use of substantially faster rearward movement of the conveyor system than forward movement of the harvester, in conjunction with the trigger system and positive spacing control on the spear and on the stick, permits reliable, uniform loading of sticks under all conditions. The relative speeds of forward movement and conveyor can easily be adjusted through a wide range to suit particular harvesting conditions encountered; conveyor speed twice that of harvester speed works well, for example, yielding a suitable dwell time.

FIGURE SIX

LEAF LIFTER MECHANISM

FIG. 6 diagrams an all-mechanical leaf lifter mechanism which operates once each time the leaf lifter trigger contacts a stalk of standing tobacco and then locksout, precluding plant damage through unwanted double-stroking by the leaf lifter arm. Each operating cycle consists of an outthrust of the leaf lifter arm from a low, concealed position laterally across the central passage or plant passage in the harvester, accompanied by an upward movement of the leaf lifter arm permitting the nearest conveyor system arm to contact the plant without leaf crushing, followed by lateral retraction in the high position of the leaf lifter arm to a concealed or fully retracted position from which the leaf lifter arm sinks while retracted to a low position ready for the next operating cycle.

In brief, the leaf lifter arm 46 is driven responsively through a cycle of operation by one rotation of a shaft to which it mounts when a trigger on striking a plant releases a lug holding the shaft in one position of rotation of the shaft and at the same time engages a clutch, rotating the shaft one turn until the lug under springbias again stops rotation of the shaft and disengages the clutch.

Details of the lifter are as follows, the parts being described generaly in sequence. This assembly is located at the right front of the harvester, at the bottom; central passage 26 of the harvester is shown at the top; movement of the harvester is from left to right. The leaf lifter mechanism 48 comprises trigger 44 which pivots to the rear when it contacts a plant stalk, thrusting rod 196 longitudinally through fixed guide 198 and pivoting bellcrank 200 against the bias of the bellcrank spring 202 until guide roller 204 pivotally offsets the rod end by contact with rod-end-incline 196a against the bias of reset spring 206.

The bellcrank in turn pulls connection 208, pivoting link 210 away from stop 212, causing a second link 214 to pivot "L"-shaped member 216 about point 218 on a bellcrank arm, moving roller 220 on the "L"-shaped member to the left, freeing stop lug 222 which is fixed on shaft 224.

Release of the lug permits spring 226 to draw bellcrank 228 around, thrusting link 230 to the right, pivoting yoke 232 about pivot 234, and sliding to the right clutch cone 236, which keys to the shaft, engaging clutch body 238 which rotates freely on the shaft and is continuously driven through a conventional pulley and belt 240, 242 and thus rotating the shaft.

Rotation of the shaft rotates crank 244 which is fixed to it, carrying leaf lifter arm 46 by means of the pivot 245. The leaf lifter arm rear end guides on straight cam 246 by means of cam follower 248. The leaf lifter arm 46 moves laterally through the lower portion of the leaf lifter arm cycle, then upward then retracts in the upward position behind shield 250, and finally returns to the lower position at which point the stop lug 222 again impacts on roller 220, rotating bellcrank 228 and disengaging the clutch cone portion 236, ready for another cycle when triggered. 252 and 254 are bearing blocks for the shaft.

From the above it will be seen that double-stroking by the leaf lifter is not a problem short of outright mechanical failure.

FIGURE SEVEN

SYNCHRONIZING MECHANISM FOR SPEARS; GRIPPING/CONVEYOR INDEXING OPERATIONS

FIG. 7 shows the failsafe locking linkage which causes the spear gripping and conveyor system to actuate one step in synchronism in response to contact of the second trigger 56 with the stalk of a tobacco plant, and stop.

This assembly is at the left front of the harvester, at the bottom; the center passage in the harvester is at the top in the Figure and direction of harvester movement is from right to left.

Valve 256 controls the motor 92 located at the extreme top of the harvester at the rear. This motor is indicated here on a reduced scale, but is shown in-scale and is further described in reference to the second, third and fourth Figures above. Function of the motor is to rotate the internal cams 96, 98 which actuate the spear gripping system, and the conveyor drive shaft on a one-to-one basis. Suitable hydraulic lines connect this motor with the valve as will be seen.

Actuation of the valve is as said by trigger 56, the second trigger, which simultaneously unlocks the conveyor system and permits spring 258 pressing against tubular frame member 194 to actuate the valve, operating the motor. Provisions then permit the conveyor system to shut off the valve after one rotation of the conveyor system forward shaft. Details are as follows.

As the indexing trigger 56 contacts a stalk of standing tobacco it pivots rearwardly on axis 260 (arrow) against the bias of restoring spring 262, drawing link 264 toward it. This rocks the center-pivoted connecting link 266 and breaks the straightline bracing mode of pivotally inter-connecting links 268 and 270 which respectivly have pivots at their free ends to the frame and to the valve stem.

The straightline or bracing mode of these pivotally interconnecting links prevents the angled, cam following extension 276a, of the valve stem 276 from pivoting about valve stem joint 278.

When the trigger and linkage pull the valve stem extension free of the recess at step 280 in rotary cam 282, which is fixed on the end of the conveyor forward shaft 58, this both releases the conveyor to move, and the valve stem to open the valve under the spring bias. The valve then actuates motor 92, causing the conveyor rear shaft to rotate, moving the conveyor and by rotating the cams, synchronously shifting the grippers on the floating spear from one set to the other.

At this instant forward movement of the harvester and the saw, and the incremental movement of the conveyor system, have severed the stalk of the particular tobacco plant and thrust it rearwardly, freeing the indexing trigger, which returns under spring bias and falls into the 50% cutout of the cam. The cam continues to rotate under power (arrow) until it engages the angled cam follower extension of the valve stem and draws the valve shut against bias of the valve stem spring. The trigger returns to set position under bias of the trigger spring, resetting the straightline or bracing mode of the interconnecting links, locking the indexing mechanism so that only displacement of the trigger by a succeeding tobacco stalk can produce further shifting of the spear gripping and incremental motion of the conveyor system.

FIGURE EIGHT

DIAGRAMMATIC DETAILS OF STICK FEED

FIG. 8 diagrams in side elevation the forward portion of the stick pusher-and-loader "Y" frame at 136a; the stick ejector bar or pusher bar 136 has pivotal attachment to this carriage frame at 136c.

For loaded-stick ejection the bar under sideways actuation advances from left to right past the socket 62a of the spear, thrusting against stick-impaled plant stalks on a loaded stick held at the forward end in the spear socket and at the rearward end in the similar rear socket. All provisions are similar at the rear. This causes the right side 62b of the spear socket to pivot out on hinge 62c, freeing the loaded stock, after which a spring, represented at 62d, conventionally closes the hinged side again, ready to receive the next stick, shown here at S and delivered as indicated, as follows.

With the assembly in the position shown the operator drops a stick S between chute-like guides 286 and into the space between laterally spaced protrusions 288 on the pusher frame, where the stick rests on bottom 290, also carried on the frame by slide bracket 292. When the pusher stroke carries past the stick ejection position on stick ejection, it positions the stick over the spear socket at which point the stick is dropped into the socket by contact between fixed stop 294 on the harvester and adjustment screw 296 on the slide, effectively removing the bottom. Spring 298 returns the bottom to stick-retaining position when the carriage mechanism returns to retracted position where lug 300 limits the bottom position.

Also indicated in this Figure are the carriage support by roller and way, the spear gripper jaws 184, 184a.

FIGURE NINE

HYDRAULIC POWER AND CONTROL SYSTEM

FIG. 9 indicates through the simplicity and economy of parts the overall reliability and low cost the inventor has devised in the harvester.

The diagram is viewed as from the lift side of the harvester, the front end being to the left.

Gasoline engine 126 mechanically drives hydraulic pump 132 which supplies power through pressure lines 133 to actuate the three motors of the system; 168, the stick loader and ejector motor being supplied through control valve 174; 36, the saw motor which operates continuously (it may have a shut-off valve if desired for testing), and indexing motor 92 for the spear gripping and conveyor systems, supplied through the indexing valve 256. 284 is the fluid return line. In total, including return tank, this fluid system comprises only seven essential units.

B. SOME INVENTIVE COACTIONS OF THE SYSTEM

From the foregoing the minimum disturbance of the tobacco plants between standing, growing attitude and gently laid over released attitude will be evident, even though the plants are positively controlled at all times. This straightline, substantially level processing from stump to stick provided by the invention reduces bruising and breaking and folding injury possibilities to a minimum. The leaf lifter lifts the forward lower leaves of each standing plant just long enough and high enough for the next-in-turn conveyor arm to approach plant without crumpling the leaves. The independent triggers for the leaf lifter and the conveyor indexing, and the close grouping behind the triggers in sequence, of the saw periphery and the vertical-axis, obliquely yielding roller guides and the rigidly held spear point, permit exact synchronization so that the standing plant almost simultaneously with the leaf lifting and within an inch or two of harvester motion is severed from the stump, gently centered, and urged onto the advancing spear, the upper leaves being meanwhile subjected to minimum friction although stabilized from toppling the plant. The paired guide-rollers are independently sprung and obliquely angled so that a stalk cannot thrust either one aside without the force-resultant of bearing on both.

The short path the plant travels relative to the harvester minimizes plant handling.

As the plants are ejected, the force which tips them gently to the side is not applied to the leaves, but instead is applied at the butts of the stalks. As noted, just after each stick-impaled group on release falls an inch or so butt-down to the ground, the ejector bar pressure continues against the stalk (six or eight inches from the bottom) levering the plants over, about the yielding fulcrum of the ground-contact of the butts. Acceleration of the plants is thus gradual although positive as they are released and are laid over away from the harvester onto the ground. The invention accomplishes this easy contact for plant release with an absolute minimum of complexity-only one pusher bar, and one hinged side on each of the two stick holding sockets. Spring drive link (186 of the 4th FIG.) cushions this.

Harvesters according to this invention can easily be changed in height without changing the operation. Varieties of dark tobacco as grown in different locations have different characteristic average heights; in Kentucky the height is 5 feet six inches (165 cm) and in Maryland as noted, 4 feet (120 cm), for example. Manufacturing harvesters extended in height for clearing the higher varieties simply entails increasing the vertical length of the frame members and shafts, in effect merely splicing in a section of each just below the top of the frame, together with frame heightening sections.

Although the first and second triggers provide the highly desirable independence in leaf lifting and indexing adjustments it will be appreciated that one trigger could conceivably be used for both, and for tobacco without damageable low leaves it is possible that the leaf lifter mechanism can be eliminated.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by U.S. Letters Patent is:

1. In a tobacco harvester having a frame with means for tobacco harvester, guide means for plants, means for severing stalks of plants, conveyor means for plants, including indexing means, a spear having alternating means for gripping and holding the spear generally horizontal for impaling stalks of plants and associated therewith stick holding means for receiving stalks impaled, the improvement comprising in combination: the frame having a passage for tobacco plants entirely therethrough along the lower part thereof in a fore-and-aft direction, the severing means being adjacently forward of the spear in position for severing stalks of plants instantly prior to said impaling on the spear, the guide means being resilient and located for resiliently biasing stalks after severance into centered alignment for said impaling on the spear, and all said guide means, severing means, conveying means, spear and stick holding means having alignment on the frame for substantially level, straightline harvesting of tobacco plants along said passage.

2. In a tobacco harvester as recited in claim 1, leaf lifter means having an arm, cylincal means for extending the arm across and upward in the passage and retracting the arm clear of the passage, means for actuating the leaf lifter means including: a trigger disposed in the passage in position for striking stalks of plants, drive means, and means responsive to said striking for connecting with the drive means.

3. In a tobacco harvester as recited in claim 2, said means responsive including means for limiting the leaf lifter means to one said cycle for each striking of the trigger.

4. In a tobacco harvester having a frame with means for moving the tobacco harvester, guide means for plants, means for severing stalks of plants, conveyor means for plants, including indexing means, a spear having alternating means holding the spear generally horizontal for impaling stalks of plants and associated therewith stick holding means for receiving stalks impaled, the improvement comprising: the frame having a passage for tobacco plants along the lower part thereof in a fore-and-aft direction; all said guide means, severing means, conveyor means, spear and stick holding means having alignment on the frame for substantially level, straightline harvesting of tobacco plants along said passage; leaf lifter means having an arm, cyclical means for extending the arm across and upward in the passage and retracting the arm; means for actuating the leaf lifter means including: a trigger disposed in the passage in position for striking stalks of plants, means responsive to said striking; and said means responsive including means for limiting the leaf lifter means to one said cycle for each said striking of the trigger.

5. In a tobacco harvester as recited in claim 4, the means responsive including a power source, a clutch connection therewith, means for biasing the clutch connection, linkage actuable for engaging the clutch connection against said bias; a member movable a distance in response to the trigger, for actuating the linkage upon engagement therewith; and incline and guide structure for disengaging said engagement between the trigger and the member at a point short of said distance.

6. In a tobacco harvester as recited in claim 1, a gripper guide structure respectively parallel-spaced from and on each side of the spear, and each said gripping means having position relative to a gripper guide structure for completely retracting into a gripper guide structure when not gripping.

7. In a tobacco harvester as recited in claim 6, said gripping means comprising four pairs of opposed longitudinal grippers, means for moving said longitudinal grippers longitudinally for gripping and retracting; said spear being rectangular in section; a longitudinal gripper of each pair of said longitudinal grippers having an end-notch with a shape for receiving three sides of said rectangular section of the spear, and a longitudinal gripper of each pair of said longitudinal grippers having a flat end for closing off a fourth side of said rectangular section of the spear.

8. In a tobacco harvester as recited in claim 1, said frame having first and second cams on the upper rear thereof, means for responsively connecting each of said gripping means with a respective one of said first and second cams including bellcrank mechanism, said means for responsively connecting extending across the top of the frame on respective sides of the frame forwardly and outwardly from the first and second cams to the bellcrank mechanism and the bellcrank mechanism extending downwardly to the gripping means; and means for length adjustment of the means for respectively connecting.

9. In a tobacco harvester as recited in claim 8, and syinchronizing means including means connecting said first and second cams with said conveyer means.

10. In a tobacco harvester as recited in claim 1, the further combination of the stick holding means including spear socket structure on the rear of the spear and rear socket structure spaced behind the spear a distance proportioned for holding a said stick therebetween for loading with plants; means for ejecting the stick when loaded with plants, including a bar, means for actuating the bar in a sideways stroke for ejection of a plant loaded stick, a movable side, having biasing closure means, on each of said spear socket structure and rear socket structure in position for actuation by a plant loaded ejected and for permitting a plant-loaded stick to be ejected sideways and drop simultaneously from said spear socket structure and rear socket structure, the means for actuating the bar sideways including a trigger adjacent the rear socket structure in position for being struck by a plant and having connection for thereupon controlling the actuating means, the actuating means having a stroke length sufficient to bear upon stalks of plants on a plant-loaded stick after said dropping and tip them over about the butts of the plants away from the bar, and said passage providing clearance for a said plant loaded stick to pass out of the tobacco harvester while the plants are tipping over away from the bar.

11. In a tobacco harvester as recited in claim 10, a stick loader machanism on the stick holding means and having a removable bottom structure for holding a stick in parallel with and following said bar upon a said sideways ejection stroke; and adjustable means for removing said removable bottom structure at a location for dropping a said stick into holding position in the spear socket structure and the rear socket structure, including an adjustment member and a fixed stop in position to limit relative motion between the fixed stop and the adjustment member.

12. In a tobacco harvester as recited in claim 11, the adjustment of said adjustable member further including a resilient drive connection on said means for actuating, and an adjustable stop on said means for actuating in position limiting said resiliency of the drive connection.

13. In a tobacco harvester as recited in claim 12, the guide means further including an endless belt support for upper portions of plants, and actuating and support means holding said endless belt support generally along a side of the passage above the conveyor means.

14. In a tobacco harvester as recited in claim 23, the guide means further including a telescoping boom, means affixing the telescoping boom at one end in forwardly projecting angular adjustment from the frame; and the forward end of the boom having an elongate guide member pendant therefrom.

15. In a tobacco harvester as recited in claim 3, said means for moving including the frame having a forward swivel wheel with height adjustable mounting at the front of the frame, and a rearward wheel with height adjustable mounting at the rear of the frame and further including means for attachment of a tractor alongside the frame comprising means for tractor connection laterally of the front of the frame, and rearward lateral tractor connection means on the frame inboard of the means for tractor connection.

16. In a tobacco harvester having a frame with means for moving the tobacco harvester, guide means for plants, means for severing stalks of plants, conveyor means for plants, including indexing means, a spear having alternating means holding the spear generally horizontal for impaling stalks of plants and associated therewith stick holding means for receiving stalks impaled, the improvement comprising: the frame having a passage for tobacco plants along the lower part thereof in a fore-and-aft direction; all said guide means, severing means, conveyor means, spear and stick holding means having alignment on the frame for substantially level, straightline harvesting of tobacco plants along said passage; drive means having connection for together driving said conveyor means and spear holding means, valve means for controlling the drive means, the indexing means comprising: a cam with relief portion, the cam having connection for rotating upon operation of the conveyor means, a cam follower having connection for actuating the valve means, means holding the valve means inoperative by holding the cam follower in the cam relief portion, including a fixed pivot and a straightline linkage with a center pivot therein bracing between said cam follower at one end thereof and said fixed pivot at the other end thereof; a trigger having connection for pivoting said center pivot upon striking a stalk and thereby removing said bracing of the straightline linkage and freeing the valve means for operation on the conveyor means and rotation of the cam; and means biasing the cam follower into said cam relief portion and again holding the valve means inoperative upon said rotation of the cam.

17. In a tobacco harvester having a frame with means for moving the tobacco harvester, guide means for plants, means for severing stalks of plants, conveyor means for plants, including indexing means, a spear having alternating means holding the spear generally horizontal for impaling stalks of plants and associated therewith stick holding means for receiving stalks impaled, the improvement comprising: the frame having a passage for tobacco plants along the lower part thereof in a fore-and-aft direction; all said guide means, severing means, conveyor means, spear, stick holding means having alignment on the frame for substantially level, straightline harvesting of tobacco plants along said passage; the guide means including a pair of vertical axis intake endless belts having inward runs spaced apart to receive therebetween tobacco plants in said passage, and means operating said intake endless belts at substantially the rate of harvester movement, providing a relatively frictionless upright-support for plants.

18. In a tobacco harvester having a frame with means for moving the tobacco harvester, guide means for plants, means for severing stalks of plants, conveyor means for plants, including indexing means, a spear having alternating means holding the spear generally horizontal for impaling stalks of plants and associated therewith stick holding means for receiving stalks impaled, the improvement comprising: the frame having a passage for tobacco plants along the lower part thereof in a fore-and-aft direction; all said guide means, severing means, spear, stick holding means having alignment on the frame for substantially level, straightline harvesting of tobacco plants along said passage; the guide means including a pair of intake endless belts having inward runs, means operating said intake endless belts at substantially the rate of harvester movement, providing a relatively frictionless upright-support for plants, and the guide means further including a pair of vertical axis rollers forming a throat between them adjacent the forward end of the spear, and means yieldably biasing each roller at an oblique angle forwardly and toward the center of the passage.

19. In a tobacco harvester having a frame with means for directing the harvester forwardly along a row of standing plants of tobacco, means for guiding plants, means for severing plants at the stalks thereof, means for forcing severed plants rearwardly in spaced succession, means for impaling severed plants at a point on the stalk on a horizontal spear held by alternating grippers, means for loading impaled plants from the spear onto a stick, and means for unloading each stick when loaded with impaled plants, the improvement comprising in combination: the harvester having in a passage going completely therethrough means for protectively maintaining each plant in growth attitude during said harvesting, including all said means for guiding, severing, forcing, loading, and unloading, being, when the harvester is directed along a said row, in substantial alignment for straightline harvesting of each plant; the severing means being adjacently forward of the horzontal spear a distance providing for severing plants instantly prior to impaling severed plants on the spear; means actuating the forcing means for forcing each severed plant rearwardly during severance and prior to impalement; the guiding means providing for centering the stalk of each plant at the instant of severance prior to impalement and including a pair of resiliently yielding members forming a throat at the spear point; means extensible across said passage forwardly in the harvester relative to the severing means in a position for lifting leaves on the forward side of plants being severed and preventing bruising of leaves upon forcing by said forcing means; and said spear holding and throat forming being at a height substantially equal to the height on each standing plant of the point to be impaled after plan severance.

20. In a tobacco harvester as recited in claim 19, the means for unloading including: means for depositing each stick of impaled plants downward onto the ground on the severed ends of the plants, means for ejecting each impaled-plant loaded stick by pressure laterally against the stalks of plants impaled on the impaled-plant loaded stick, and means for continuing said lateral pressure after said depositing, and tipping the plants about said plant severed ends on the ground in a direction away from the unloading means.

21. In a tobacco harvester as recited in claim 20, said passage through the harvester permitting the harvester to pass tipping plants free of further contact with the harvester.

22. In a tobacco harvester as recited in claim 21, a first trigger having a linkage for actuating the means for leaf lifting, a second trigger having a linkage for actuating the means for means for forcing, and linkage adjustment means for synchronizing actuation of the means for leaf lifting with the means for forcing by adjusting the front-to-rear relative positioning of the first and second triggers.

23. A method of harvesting, with a harvester for loading plants on a stick, plants of tobacco standing in a row, comprising the steps:
   (a) directing the harvester forwardly along the plants standing in the row;
   (b) maintaining each plant in a substantially undisturbed standing attitude while harvesting it, as follows:
      (i) first sensing each standing plan as the harvester reaches it;
      (ii) lifting a leaf on the forward side of each standing plant in response to said first sensing, for preventing injury thereto when the plants are later forced rearwardly in spaced succession by contact with the forward side thereof;
      (iii) severing each standing plant in succession at the butt of the stalk thereof adjacent ground level;
      (iv) forcing the severed plants rearwardly in spaced succesion by contact with the forward side thereof;
      (v) centering the stalk of each plant when severed by resiliently yielding lateral contact therewith;
      (vi) impaling the rearwardly forced plants in spaced succession adjacent the butts of the stalks thereof on a spear;
      (vii) passing the impaled plants in spaced succession onto a stick until the stick is loaded with a predetermined quantity thereof in spaced succession;
      (viii) causing the impaled plants on the stick to drop butt-first on the ground by laterally thrusting against the stalks of the impaled plants on the stick and dislodging the stick from the harvester; and
   (c) continuing said lateral thrusting, against the stalks, and causing the impaled plants on the stick to tip over onto a side thereof by pivoting same about said butts on the ground; thereby harvesting said plants of tobacco.

24. In a method as recited in claim 23, the step of maintaining each plant in a substantially undisturbed standing attitude while harvesting it, including: guiding an upper portion of the plant with a contact substantially unmoving relative to the plant.

25. A method of harvesting, with a harvester for loading plants on a stick, plants of tobacco standing in a row, comprising the steps:
   (a) directing the harvester forwardly along the plants standing in the row;
   (b) maintaining each plant in a substantially undisturbed standing attitude while harvesting it, as follows:
      (i) severing each standing plant in succession at the butt of the stalk thereof adjacent ground level;
      (ii) forcing the severed plants rearwardly in spaced succession;
      (iii) centering the stalks of the severed plants by a bias diagonally forward from either side of the stalks;
      (iv) impaling the rearwardly forced plants adjacent the butts of the stalks thereof on a spear;
      (v) passing the impaled plants onto a stick until the stick is loaded with a predetermined quantity thereof; and
      (vi) removing the stick of impaled plants from the harvester;
   thereby harvesting said plants of tobacco.

* * * * *